(12) United States Patent
Hehenberger et al.

(10) Patent No.: US 8,037,618 B2
(45) Date of Patent: Oct. 18, 2011

(54) DEVICE FOR DRAINING AND DRYING SOLIDS, IN PARTICULAR PLASTICS GRANULATED UNDER WATER

(75) Inventors: Gerhard Hehenberger, Eggenberg (AT); Johannes Remili, Wilhering (AT)

(73) Assignee: ECON Maschinenbau und Steuerungstechnik GmbH, Weiskirchen (AT)

( * ) Notice: Subject to any disclaimer, the term of this patent is extended or adjusted under 35 U.S.C. 154(b) by 1025 days.

(21) Appl. No.: 11/901,811

(22) Filed: Sep. 19, 2007

(65) Prior Publication Data

US 2008/0072447 A1   Mar. 27, 2008

(30) Foreign Application Priority Data

Sep. 20, 2006   (EP) ..................... 06120976

(51) Int. Cl.
*F26B 11/00* (2006.01)
(52) U.S. Cl. ............... 34/184; 34/647; 34/138; 34/168; 8/142; 210/781; 210/169; 705/14; 166/245; 166/302; 37/197
(58) Field of Classification Search .......... 34/184, 34/138, 169, 647, 90, 210, 242, 218; 705/14; 210/781, 169; 166/245, 302; 8/142; 37/197
See application file for complete search history.

(56) References Cited

U.S. PATENT DOCUMENTS

| | | | | |
|---|---|---|---|---|
| 2,074,265 A | * | 3/1937 | Kirby | 261/90 |
| 2,114,776 A | * | 4/1938 | Davis | 68/18 R |
| 2,222,633 A | * | 11/1940 | Sheesley | 425/82.1 |
| 2,739,669 A | * | 3/1956 | Miller | 95/113 |
| 2,739,670 A | * | 3/1956 | Miller | 95/113 |
| 2,920,399 A | * | 1/1960 | Fry, Jr. | 34/647 |
| 3,125,294 A | * | 3/1964 | Lill | 239/172 |

(Continued)

FOREIGN PATENT DOCUMENTS

DE   3902730 A1 * 8/1990

(Continued)

OTHER PUBLICATIONS espacenet English language abstract of DE 10 2004 053 929, May 11, 2006.

*Primary Examiner* — Stephen M. Gravini
(74) *Attorney, Agent, or Firm* — Tiajoloff and Kelly LLP

(57) ABSTRACT

Device for dewatering and drying solids, especially plastics granulated under water, in form of a centrifuge dryer comprising a housing (1) having an inlet opening (2) for the solid material with adhering water and an outlet opening (3) for the dehydrated solid material, a screen cylinder (4) fixedly disposed inside the housing (1), a rotor (5) arranged inside the screen cylinder (4) and wings (6) attached to the rotor at a distance from one another, a water drain (7), and arrangements (8, 8') for the introduction and removal of an air stream passing vertically through the device. It is distinguished on the one hand in that the inlet opening (2) is arranged tangential to the screen cylinder (4, 10). On the other hand it is distinguished in that the fixed screen cylinder (4) is comprised of at least three screen cylinders (10, 11, 12) arranged vertically one over another, each of the screen cylinders (10, 11, 12) is being comprised of at least two segment shells (10, 10', 11, 11', 12, 12') where the lowermost screen cylinder (10) is comprised of a screen-like shell (10') and a solid segment shell (10").

17 Claims, 3 Drawing Sheets

U.S. PATENT DOCUMENTS

| | | | |
|---|---|---|---|
| 3,197,798 A * | 8/1965 | Brown et al. | 15/320 |
| 3,206,950 A * | 9/1965 | Xeros | 68/12.09 |
| 3,277,583 A * | 10/1966 | Mack | 34/58 |
| 3,319,556 A * | 5/1967 | Fiore | 396/546 |
| 3,702,488 A * | 11/1972 | Kasper | 15/50.3 |
| 3,726,756 A * | 4/1973 | Polak | 162/50 |
| 3,794,166 A * | 2/1974 | Converse et al. | 209/301 |
| 3,837,029 A * | 9/1974 | Kasper | 15/50.3 |
| 3,879,789 A * | 4/1975 | Kasper | 15/50.3 |
| 3,951,805 A * | 4/1976 | Dodd | 210/193 |
| 3,956,135 A * | 5/1976 | Mercier | 210/377 |
| 4,028,222 A * | 6/1977 | Prull | 208/425 |
| 4,164,467 A * | 8/1979 | Liller | 209/10 |
| 4,199,459 A * | 4/1980 | Filipowicz et al. | 210/325 |
| 4,218,323 A * | 8/1980 | McCracken | 210/415 |
| 4,325,819 A * | 4/1982 | Altizer | 209/10 |
| 4,339,280 A * | 7/1982 | Mercier | 127/56 |
| 4,344,479 A * | 8/1982 | Bailey | 165/109.1 |
| 4,455,282 A * | 6/1984 | Marquess et al. | 422/199 |
| 4,565,015 A * | 1/1986 | Hundley, III | 34/182 |
| 4,716,218 A * | 12/1987 | Chen et al. | 530/372 |
| 4,879,075 A * | 11/1989 | Hinton | 261/26 |
| 4,896,435 A * | 1/1990 | Spangler, Jr. | 34/58 |
| 4,922,625 A * | 5/1990 | Farmer | 34/58 |
| 4,954,222 A * | 9/1990 | Durr et al. | 202/176 |
| 4,961,722 A * | 10/1990 | Taylor et al. | 494/36 |
| 4,991,766 A * | 2/1991 | Hunnicutt et al. | 228/175 |
| 5,069,755 A * | 12/1991 | Durr et al. | 202/169 |
| 5,073,201 A * | 12/1991 | Giesfeldt et al. | 127/67 |
| 5,090,498 A * | 2/1992 | Hamill | 175/206 |
| 5,125,166 A * | 6/1992 | Farmer | 34/58 |
| 5,136,792 A * | 8/1992 | Janecke | 34/78 |
| 5,265,347 A * | 11/1993 | Woodson et al. | 34/58 |
| 5,279,047 A * | 1/1994 | Janecke | 34/78 |
| 5,331,106 A * | 7/1994 | Spas | 423/130 |
| 5,361,711 A * | 11/1994 | Beyerl | 111/127 |
| 5,366,591 A * | 11/1994 | Jewell | 162/9 |
| 5,534,139 A * | 7/1996 | Cadek et al. | 210/96.1 |
| 5,556,976 A * | 9/1996 | Jewell | 544/296 |
| 5,626,766 A * | 5/1997 | Cadek et al. | 210/709 |
| 5,638,606 A * | 6/1997 | Bryan et al. | 34/59 |
| 5,662,810 A * | 9/1997 | Willgohs | 210/781 |
| 5,695,130 A * | 12/1997 | Csendes | 241/19 |
| 5,737,674 A * | 4/1998 | Venkatesan et al. | 399/250 |
| 5,958,233 A * | 9/1999 | Willgohs | 210/259 |
| 5,964,985 A * | 10/1999 | Wootten | 201/40 |
| 5,987,769 A * | 11/1999 | Ackerman et al. | 34/58 |
| 5,988,264 A * | 11/1999 | Goldsmith | 165/48.1 |
| 6,003,500 A * | 12/1999 | Packard et al. | 123/563 |
| 6,013,158 A * | 1/2000 | Wootten | 202/99 |
| 6,035,834 A * | 3/2000 | Packard et al. | 123/563 |
| 6,106,592 A * | 8/2000 | Paranjpe et al. | 95/65 |
| 6,109,452 A * | 8/2000 | Leung et al. | 210/369 |
| 6,129,042 A * | 10/2000 | Smith et al. | 118/694 |
| 6,138,375 A * | 10/2000 | Humphries et al. | 34/59 |
| 6,138,647 A * | 10/2000 | Packard et al. | 123/563 |
| 6,143,221 A * | 11/2000 | Gurol | 264/118 |
| 6,145,498 A * | 11/2000 | Packard et al. | 123/563 |
| 6,237,244 B1 * | 5/2001 | Bryan et al. | 34/59 |
| 6,267,250 B1 * | 7/2001 | Leung et al. | 210/369 |
| 6,270,708 B1 * | 8/2001 | Gurol | 264/117 |
| 6,326,054 B1 * | 12/2001 | Smith et al. | 427/168 |
| 6,327,994 B1 * | 12/2001 | Labrador | 114/382 |
| 6,360,975 B1 * | 3/2002 | Csendes | 241/19 |
| 6,368,657 B1 * | 4/2002 | Lee | 426/658 |
| 6,432,299 B1 * | 8/2002 | Hensley et al. | 210/87 |
| 6,438,864 B1 * | 8/2002 | Sandford | 34/168 |
| 6,467,188 B1 * | 10/2002 | Sandford | 34/168 |
| 6,505,416 B2 * | 1/2003 | Sandford | 34/168 |
| 6,514,421 B2 * | 2/2003 | Leung et al. | 210/781 |
| 6,655,039 B2 * | 12/2003 | Hultsch | 34/58 |
| 6,691,536 B2 * | 2/2004 | Severns et al. | 68/12.27 |
| 6,739,457 B2 * | 5/2004 | Humphries et al. | 210/374 |
| 6,807,748 B2 * | 10/2004 | Bryan et al. | 34/108 |
| 6,887,710 B2 * | 5/2005 | Call et al. | 436/53 |
| 6,898,951 B2 * | 5/2005 | Severns et al. | 68/5 C |
| 6,904,885 B2 * | 6/2005 | Osband | 123/195 R |
| 7,024,794 B1 * | 4/2006 | Mynes | 34/59 |
| 7,025,883 B1 * | 4/2006 | Olivier | 210/602 |
| 7,040,101 B2 * | 5/2006 | Takeda et al. | 62/78 |
| 7,044,429 B1 * | 5/2006 | Foreman et al. | 249/205 |
| 7,171,762 B2 * | 2/2007 | Roberts et al. | 34/312 |
| 7,244,356 B2 * | 7/2007 | Olivier | 210/151 |
| 7,275,400 B2 * | 10/2007 | Severns et al. | 68/18 F |
| 7,306,733 B2 * | 12/2007 | Olivier | 210/615 |
| 7,312,973 B2 * | 12/2007 | Sekoguchi et al. | 361/231 |
| 7,421,802 B2 * | 9/2008 | Roberts et al. | 34/312 |
| 7,442,306 B2 * | 10/2008 | Olivier | 210/616 |
| 7,533,719 B2 * | 5/2009 | Hinson et al. | 166/75.11 |
| 7,540,324 B2 * | 6/2009 | de Rouffignac et al. | 166/245 |
| 7,562,707 B2 * | 7/2009 | Miller | 166/245 |
| 7,569,354 B2 * | 8/2009 | Okano et al. | 435/7.1 |
| 7,597,147 B2 * | 10/2009 | Vitek et al. | 166/302 |
| 7,604,052 B2 * | 10/2009 | Roes et al. | 166/267 |
| 7,610,962 B2 * | 11/2009 | Fowler | 166/267 |
| 7,622,140 B2 * | 11/2009 | Whittle et al. | 424/725 |
| 7,631,689 B2 * | 12/2009 | Vinegar et al. | 166/245 |
| 7,631,690 B2 * | 12/2009 | Vinegar et al. | 166/245 |
| 7,635,023 B2 * | 12/2009 | Goldberg et al. | 166/245 |
| 7,635,024 B2 * | 12/2009 | Karanikas et al. | 166/245 |
| 7,638,915 B2 * | 12/2009 | Sentmanat | 310/156.11 |
| 7,644,765 B2 * | 1/2010 | Stegemeier et al. | 166/302 |
| 7,673,681 B2 * | 3/2010 | Vinegar et al. | 166/252.1 |
| 7,673,786 B2 * | 3/2010 | Menotti | 228/214 |
| 7,677,310 B2 * | 3/2010 | Vinegar et al. | 166/272.1 |
| 7,677,314 B2 * | 3/2010 | Hsu | 166/302 |
| 7,681,647 B2 * | 3/2010 | Mudunuri et al. | 166/302 |
| 7,683,296 B2 * | 3/2010 | Brady et al. | 219/553 |
| 7,703,513 B2 * | 4/2010 | Vinegar et al. | 166/245 |
| 7,717,171 B2 * | 5/2010 | Stegemeier et al. | 166/261 |
| 7,730,945 B2 * | 6/2010 | Pieterson et al. | 166/272.1 |
| 7,730,946 B2 * | 6/2010 | Vinegar et al. | 166/272.3 |
| 7,730,947 B2 * | 6/2010 | Stegemeier et al. | 166/272.3 |
| 7,731,163 B2 * | 6/2010 | Olivier | 261/79.2 |
| 7,780,750 B2 * | 8/2010 | Carman | 48/61 |
| 7,785,427 B2 * | 8/2010 | Maziasz et al. | 148/327 |
| 7,793,722 B2 * | 9/2010 | Vinegar et al. | 166/302 |
| 7,798,220 B2 * | 9/2010 | Vinegar et al. | 166/272.3 |
| 7,832,484 B2 * | 11/2010 | Nguyen et al. | 166/302 |
| 7,841,401 B2 * | 11/2010 | Kuhlman et al. | 166/245 |
| 7,841,408 B2 * | 11/2010 | Vinegar | 166/272.3 |
| 7,841,425 B2 * | 11/2010 | Mansure et al. | 175/57 |
| 7,845,411 B2 * | 12/2010 | Vinegar et al. | 166/302 |
| 7,849,922 B2 * | 12/2010 | Vinegar et al. | 166/272.1 |
| 7,866,385 B2 * | 1/2011 | Lambirth | 166/256 |
| 7,875,173 B1 * | 1/2011 | Barnes | 210/167.1 |
| 7,912,358 B2 * | 3/2011 | Stone et al. | 392/301 |
| 7,931,086 B2 * | 4/2011 | Nguyen et al. | 166/302 |
| 2002/0014019 A1 * | 2/2002 | Hultsch | 34/184 |
| 2002/0030024 A1 * | 3/2002 | Leung et al. | 210/781 |
| 2002/0062575 A1 * | 5/2002 | Sandford | 34/168 |
| 2002/0062576 A1 * | 5/2002 | Sandford | 34/168 |
| 2002/0124664 A1 * | 9/2002 | Call et al. | 73/863.22 |
| 2002/0133886 A1 * | 9/2002 | Severns et al. | 8/142 |
| 2003/0033725 A1 * | 2/2003 | Humphries et al. | 34/58 |
| 2003/0037757 A1 * | 2/2003 | Osband | 123/195 R |
| 2003/0131623 A1 * | 7/2003 | Suppes | 62/324.1 |
| 2003/0221438 A1 * | 12/2003 | Rane et al. | 62/271 |
| 2004/0000069 A1 * | 1/2004 | Gurol | 34/592 |
| 2004/0000734 A1 * | 1/2004 | Kapphan et al. | 264/29.1 |
| 2004/0007000 A1 * | 1/2004 | Takeda et al. | 62/78 |
| 2004/0086774 A1 * | 5/2004 | Munoz et al. | 429/42 |
| 2004/0129032 A1 * | 7/2004 | Severns et al. | 68/5 C |
| 2004/0147767 A1 * | 7/2004 | Whittle et al. | 549/390 |
| 2005/0050644 A1 * | 3/2005 | Severns et al. | 8/115.51 |
| 2005/0109695 A1 * | 5/2005 | Olivier | 210/605 |
| 2005/0133423 A1 * | 6/2005 | Olivier | 210/169 |
| 2005/0159309 A1 * | 7/2005 | Hubbell et al. | 502/439 |
| 2005/0168907 A1 * | 8/2005 | Sekoguchi et al. | 361/230 |
| 2006/0080854 A1 * | 4/2006 | Mynes | 34/59 |
| 2006/0130353 A1 * | 6/2006 | Eloo | 34/58 |
| 2006/0144784 A1 * | 7/2006 | Olivier | 210/602 |
| 2006/0169627 A1 * | 8/2006 | Olivier | 210/198.1 |
| 2006/0202369 A1 * | 9/2006 | Foreman et al. | 264/1.32 |
| 2006/0257287 A1 * | 11/2006 | Call et al. | 422/83 |
| 2007/0036881 A1 * | 2/2007 | Griffith | 426/11 |
| 2007/0059763 A1 * | 3/2007 | Okano et al. | 435/7.1 |

| Publication No. | Date | Inventor | Class |
|---|---|---|---|
| 2007/0245934 A1* | 10/2007 | Carman | 110/229 |
| 2007/0284108 A1* | 12/2007 | Roes et al. | 166/302 |
| 2007/0289733 A1* | 12/2007 | Hinson et al. | 166/60 |
| 2008/0017380 A1* | 1/2008 | Vinegar et al. | 166/302 |
| 2008/0035346 A1* | 2/2008 | Nair et al. | 166/302 |
| 2008/0035347 A1* | 2/2008 | Brady et al. | 166/302 |
| 2008/0035348 A1* | 2/2008 | Vitek et al. | 166/302 |
| 2008/0035705 A1* | 2/2008 | Menotti | 228/102 |
| 2008/0038144 A1* | 2/2008 | Maziasz et al. | 420/45 |
| 2008/0054745 A1* | 3/2008 | Sentmanat | 310/89 |
| 2008/0072447 A1* | 3/2008 | Hehenberger et al. | 34/318 |
| 2008/0128134 A1* | 6/2008 | Mudunuri et al. | 166/302 |
| 2008/0135244 A1* | 6/2008 | Miller | 166/272.6 |
| 2008/0135253 A1* | 6/2008 | Vinegar et al. | 166/302 |
| 2008/0135254 A1* | 6/2008 | Vinegar et al. | 166/303 |
| 2008/0142216 A1* | 6/2008 | Vinegar et al. | 166/302 |
| 2008/0142217 A1* | 6/2008 | Pieterson et al. | 166/272.6 |
| 2008/0166468 A1* | 7/2008 | Meduri | 426/639 |
| 2008/0173442 A1* | 7/2008 | Vinegar et al. | 166/245 |
| 2008/0173444 A1* | 7/2008 | Stone et al. | 166/250.15 |
| 2008/0173449 A1* | 7/2008 | Fowler | 166/272.1 |
| 2008/0173450 A1* | 7/2008 | Goldberg et al. | 166/302 |
| 2008/0174115 A1* | 7/2008 | Lambirth | 290/2 |
| 2008/0185147 A1* | 8/2008 | Vinegar et al. | 166/288 |
| 2008/0201980 A1* | 8/2008 | Bullinger et al. | 34/493 |
| 2008/0217003 A1* | 9/2008 | Kuhlman et al. | 166/245 |
| 2008/0217004 A1* | 9/2008 | de Rouffignac et al. | 166/245 |
| 2008/0217015 A1* | 9/2008 | Vinegar et al. | 166/302 |
| 2008/0217016 A1* | 9/2008 | Stegemeier et al. | 166/303 |
| 2008/0236831 A1* | 10/2008 | Hsu | 166/302 |
| 2008/0250933 A1* | 10/2008 | Yun | 96/251 |
| 2008/0276498 A1* | 11/2008 | Soderberg et al. | 37/197 |
| 2008/0277113 A1* | 11/2008 | Stegemeier et al. | 166/272.1 |
| 2008/0283246 A1* | 11/2008 | Karanikas et al. | 166/302 |
| 2008/0289208 A1* | 11/2008 | Bryan | 34/59 |
| 2008/0313917 A1* | 12/2008 | Fraza | 34/181 |
| 2008/0314356 A1* | 12/2008 | Kamen et al. | 123/197.3 |
| 2009/0014180 A1* | 1/2009 | Stegemeier et al. | 166/302 |
| 2009/0014181 A1* | 1/2009 | Vinegar et al. | 166/302 |
| 2009/0042200 A1* | 2/2009 | Okano et al. | 435/6 |
| 2009/0042739 A1* | 2/2009 | Okano et al. | 506/12 |
| 2009/0062427 A1* | 3/2009 | Tornow et al. | 523/223 |
| 2009/0071652 A1* | 3/2009 | Vinegar | 166/303 |
| 2009/0078461 A1* | 3/2009 | Mansure et al. | 175/17 |
| 2009/0084547 A1* | 4/2009 | Farmayan et al. | 166/272.1 |
| 2009/0090158 A1* | 4/2009 | Davidson et al. | 72/369 |
| 2009/0090509 A1* | 4/2009 | Vinegar et al. | 166/303 |
| 2009/0095476 A1* | 4/2009 | Nguyen et al. | 166/302 |
| 2009/0095477 A1* | 4/2009 | Nguyen et al. | 166/302 |
| 2009/0095478 A1* | 4/2009 | Karanikas et al. | 166/303 |
| 2009/0095479 A1* | 4/2009 | Karanikas et al. | 166/303 |
| 2009/0095480 A1* | 4/2009 | Vinegar et al. | 166/302 |
| 2009/0120646 A1* | 5/2009 | Kim et al. | 166/302 |
| 2009/0126216 A1* | 5/2009 | Eloo et al. | 34/58 |
| 2009/0126929 A1* | 5/2009 | Vinegar | 166/263 |
| 2009/0149571 A1* | 6/2009 | Lux et al. | 523/129 |
| 2009/0181126 A1* | 7/2009 | Wicking et al. | 426/61 |
| 2009/0241384 A1* | 10/2009 | Mann | 84/384 |
| 2009/0261486 A1* | 10/2009 | Olivier | 261/79.1 |
| 2009/0321071 A1* | 12/2009 | Zhang et al. | 166/250.01 |
| 2009/0321075 A1* | 12/2009 | Harris et al. | 166/302 |
| 2009/0321417 A1* | 12/2009 | Burns et al. | 219/542 |
| 2009/0325215 A1* | 12/2009 | Okano et al. | 435/29 |
| 2010/0016568 A1* | 1/2010 | Okano et al. | 536/23.1 |
| 2010/0016569 A1* | 1/2010 | Okano et al. | 536/23.1 |
| 2010/0018862 A1* | 1/2010 | Okano et al. | 204/462 |
| 2010/0021933 A1* | 1/2010 | Okano et al. | 435/7.1 |
| 2010/0037477 A1* | 2/2010 | Veltel et al. | 34/58 |
| 2010/0050458 A1* | 3/2010 | Aaron et al. | 34/59 |
| 2010/0101929 A1* | 4/2010 | Kamen et al. | 202/185.3 |
| 2010/0119606 A1* | 5/2010 | Whittle et al. | 424/484 |
| 2010/0133143 A1* | 6/2010 | Roes et al. | 208/23 |
| 2010/0150658 A1* | 6/2010 | Bilhete et al. | 405/128.15 |
| 2010/0152524 A1* | 6/2010 | Sentmanat | 600/16 |
| 2010/0272595 A1* | 10/2010 | Maziasz et al. | 420/45 |
| 2010/0276141 A1* | 11/2010 | Stegemeier et al. | 166/272.3 |
| 2011/0011078 A1* | 1/2011 | Kamen et al. | 60/517 |
| 2011/0011079 A1* | 1/2011 | Kamen et al. | 60/520 |
| 2011/0017529 A1* | 1/2011 | Durney | 180/65.1 |
| 2011/0061601 A1* | 3/2011 | Correa et al. | 119/437 |

FOREIGN PATENT DOCUMENTS

| | | | |
|---|---|---|---|
| DE | 4219173 A1 | * | 12/1993 |
| DE | 4338030 C1 | * | 11/1994 |
| DE | 102004053929 A1 | | 5/2006 |
| EP | 173676 A1 | * | 3/1986 |
| EP | 455259 A2 | * | 11/1991 |
| EP | 560693 A1 | * | 9/1993 |
| EP | 891812 A1 | * | 1/1999 |
| EP | 925899 A1 | * | 6/1999 |
| EP | 2000338 A1 | * | 12/2008 |
| EP | 2062762 A1 | * | 5/2009 |
| FR | 2577149 A1 | * | 8/1986 |
| JP | 54128051 A | * | 10/1979 |
| JP | 55123930 A | * | 9/1980 |
| JP | 55149609 A | * | 11/1980 |
| JP | 56040493 A | * | 4/1981 |
| JP | 56165842 A | * | 12/1981 |
| JP | 57065345 A | * | 4/1982 |
| JP | 57086272 A | * | 5/1982 |
| JP | 57135216 A | * | 8/1982 |
| JP | 57204218 A | * | 12/1982 |
| JP | 58028242 A | * | 2/1983 |
| JP | 58076125 A | * | 5/1983 |
| JP | 58202015 A | * | 11/1983 |
| JP | 59131164 A | * | 7/1984 |
| JP | 59200143 A | * | 11/1984 |
| JP | 60095127 A | * | 5/1985 |
| JP | 60142128 A | * | 7/1985 |
| JP | 60144537 A | * | 7/1985 |
| JP | 60201339 A | * | 10/1985 |
| JP | 60251325 A | * | 12/1985 |
| JP | 61035896 A | * | 2/1986 |
| JP | 61061333 A | * | 3/1986 |
| JP | 61261216 A | * | 11/1986 |
| JP | 62091732 A | * | 4/1987 |
| JP | 63033396 A | * | 2/1988 |
| JP | 63092101 A | * | 4/1988 |
| JP | 63103821 A | * | 5/1988 |
| JP | 01060601 A | * | 3/1989 |
| JP | 01060602 A | * | 3/1989 |
| JP | 01142004 A | * | 6/1989 |
| JP | 01152206 A | * | 6/1989 |
| JP | 01174883 A | * | 7/1989 |
| JP | 01208630 A | * | 8/1989 |
| JP | 01268593 A | * | 10/1989 |
| JP | 01288300 A | * | 11/1989 |
| JP | 02023220 A | * | 1/1990 |
| JP | 02063507 A | * | 3/1990 |
| JP | 02074754 A | * | 3/1990 |
| JP | 03070102 A | * | 3/1991 |
| JP | 05311253 A | * | 11/1993 |
| JP | 05329396 A | * | 12/1993 |
| JP | 06115936 A | * | 4/1994 |
| JP | 07034064 A | * | 2/1995 |
| JP | 07155737 A | * | 6/1995 |
| JP | 07232321 A | * | 9/1995 |
| JP | 07256637 A | * | 10/1995 |
| JP | 08122242 A | * | 5/1996 |
| JP | 09075904 A | * | 3/1997 |
| JP | 09163930 A | * | 6/1997 |
| JP | 11061700 A | * | 3/1999 |
| JP | 11063831 A | * | 3/1999 |
| JP | 11178503 A | * | 7/1999 |
| JP | 11304358 A | * | 11/1999 |
| JP | 11325722 A | * | 11/1999 |
| JP | 2000018820 A | * | 1/2000 |
| JP | 2000018821 A | * | 1/2000 |
| JP | 2000035280 A | * | 2/2000 |
| JP | 2000105077 A | * | 4/2000 |
| JP | 2000237632 A | * | 9/2000 |
| JP | 2001017888 A | * | 1/2001 |
| JP | 2001054728 A | * | 2/2001 |
| JP | 2003050087 A | * | 2/2003 |

| | | | | |
|---|---|---|---|---|
| JP | 2010006958 | A | * | 1/2010 |
| WO | WO 9741290 | A2 | * | 11/1997 |
| WO | WO 2006133530 | A2 | * | 12/2006 |

* cited by examiner

DEVICE FOR DRAINING AND DRYING SOLIDS, IN PARTICULAR PLASTICS GRANULATED UNDER WATER

FIELD OF THE INVENTION

The present invention concerns a device for dewatering and drying solids, in particular plastics granulated in water, in the form of a centrifuge dryer wherein most of the water can be separated from the mixture of granulate and water by a screen device arranged before the centrifuge dryer. The granulate with the remaining surface water that still adheres to it is then transferred to the inlet opening of the centrifuge dryer where it is accelerated by means of rotor blades and is at the end conveyed to the outlet opening.

BACKGROUND OF THE INVENTION

Such a device is for example seen in DE 10 2004 053 929 A1, where a mixture of granulate and cooling water is supplied to a centrifuge dryer which is arranged adjacent to a cooling arrangement. In the method of granulate drying shown therein, the adherent surface water is centrifuged off, together with plastic dust which also clings to the surface. At the same time, evaporative cooling takes place by the drying of the surface moisture of the granulate in an air stream. A screen-like water separator is arranged between the drying arrangement and the centrifuge dryer.

The centrifuge dryer comprises a cylindrical housing and a cylindrical screen fixedly arranged therein. Arranged within the screen is a motor driven rotor that can be driven at high revolutions. The rotor comprises paddle-like arms that accelerate the wet granulate and the water that still adheres to it. Due to the design of the arms, the granulate is propelled from the lower inlet upward and is dewatered at the same time. The water is centrifuged off through the screen.

Residual surface moisture remains on the granulate and is removed by evaporation in the centrifuge dryer. This cooling-down drying is supported by an air stream, which is aspirated from the top into the housing and is exhausted by a blower at approximately half the height of the housing.

Instead of the paddle-like arms, other known devices of the relevant art comprise baffles affixed to the rotor and arranged at an angle to the vertical axis, causing a vertical conveyance of the granulate within the centrifugal dryer from the inlet opening on the bottom upward to the outlet opening.

The disadvantage of these known devices is that the wet granulate is always supplied to the centrifuge dryer radially, whereby the granulate is caught frontally by the paddle-like arms or baffles and first propelled against the fixed screen from where it rebounds and is again captured by the paddle-like arms or baffles. This process is repeated until the granulate reaches the outlet opening and passes through it. The frontal capture of the granulate exposes it to higher mechanical stress in the inlet area. This results in greater amounts of plastic dust, which settles in the immediate area of the inlet opening, aided in particular by air stream eddies. The removal of the dust by means of cleaning fluids introduced into the centrifuge dryer space by nozzles is more difficult in this area than in the remaining inner space of the centrifuge dryer.

This can go so far that, especially for the drying of sensitive granules, in particular of composite granulates, the known centrifuge dryers cannot be used at all for the dewatering and drying of these granulates because too high a proportion of the granulate would be damaged by the known centrifuge dryer.

Due to the frontal capture of the granulate, the fixed screen and the paddle-like arms or baffles in the region near the inlet opening are exposed to much higher wear than in the regions above. Since the outlet opening is also arranged radially, there is also higher wear in the immediate vicinity of the outlet opening, especially at the frontal edge.

A further substantial disadvantage is the overall design of the device which makes it difficult to maintain. The centrifuge dryer has to be cleaned completely after every change of granulate color or composition. Any remnants that are not removed completely before the next load of plastic granulate passes through the centrifuge dryer contaminate the granulate and result in substantial quality flaws.

For this purpose, several nozzles for the cleaning fluid are commonly provided inside the centrifuge dryer. Wherever the deposit of plastic dust is particularly heavy, for example, as mentioned earlier, in the vicinity of the inlet opening, spraying of the cleaning fluid is not always sufficient, or the cleaning is only satisfactory with disproportionately great amounts of the cleaning fluid. However, since the expense of preparing the cleaning fluid is proportionate to the quantity, it is in most cases more economical to open the device, loosen the remaining residue by hand and to rinse it out. In known devices, this requires disproportionately high disassembly and reassembly expenditures.

SUMMARY OF THE INVENTION

Therefore an object of the present invention is to provide a device of the generic kind for dewatering and drying solids, especially plastics granulated in water, in form of a centrifuge dryer which reliably avoids the disadvantages of prior art.

According to an aspect of the invention, a device for dewatering and drying solids, in particular plastics granulated in water, in the form of a centrifuge dryer comprises a housing having an inlet opening for the solid material with adhering water and an outlet opening for the dewatered solid material. A screen cylinder is fixedly disposed inside the housing. A rotor is arranged inside the screen cylinder and wings are attached to the rotor at a distance from one another. A water drain and arrangements for the introduction and removal of an air stream passing vertically through the device are provided as well. The inlet opening is arranged tangentially in relation to the screen cylinder.

Other advantages on objects of the invention will become apparent from the present specification, including an advantageous variant aimed at easier cleaning of known devices of the art.

BRIEF DESCRIPTION OF THE DRAWINGS

The invention will be explained below in more detail by way of figures. Shown therein are in FIG. 1, a vertical section of the device, in FIG. 2, a diagonal view of a horizontal section of the lower portion of the device, and in FIG. 3, a vertical section of the device in a 90° offset relative to FIG. 1.

DETAILED DESCRIPTION

Figure 1:
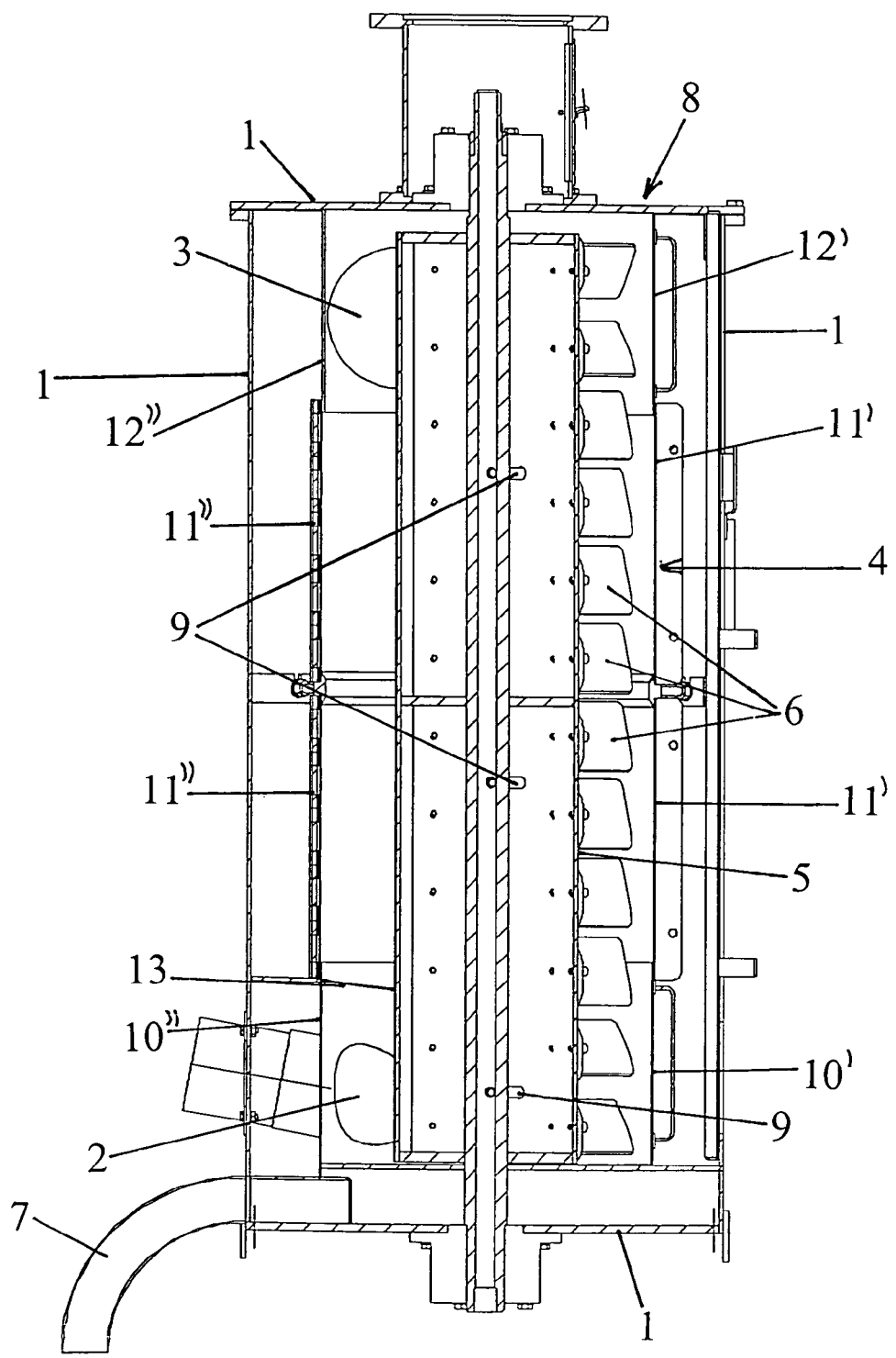

As can be seen in FIG. 1, the device according to the invention comprises a housing 1 with an inlet opening 2 for the solid material coated with surface water and an outlet opening 3 for the dewatered solid material, a screen cylinder 4 arranged fixedly in the housing 1, a rotor 5 arranged in the screen cylinder 4 and wings 6 disposed at a distance from one another on the said rotor 5, a water discharge 7, and arrangements 8, 8' for the intake and exhaust of an air stream which passes vertically through the device.

Figure 2:
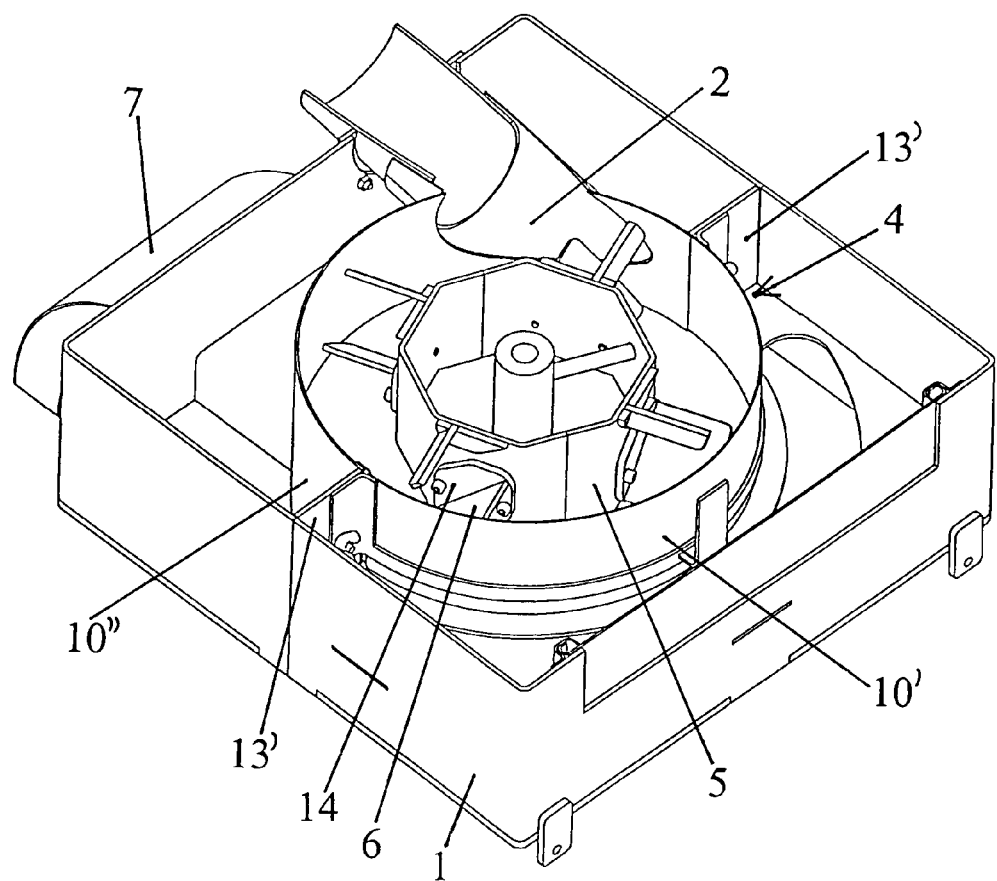

As can be seen in FIG. 2, the device for dewatering and drying solids, in particular plastics granulated in water, in the form of a centrifuge dryer, is distinguished by the inlet opening 2 being arranged tangentially in relation to the screen cylinder 4. As a result, the incoming water and granulate mixture comes in contact with the fixed screen cylinder 4 or the screen cylinder 10 essentially tangentially, whereby part of the water passes through the screen cylinder 4 or the screen cylinder 10. The granulate is captured by the wings 6 attached to the rotor 5 which spins at high revolutions, and is conveyed substantially along a spiral through the device upward to the outlet opening 3. The wings 6 propel the granulate multiple times against the inner wall of the screen cylinder so that a large part of the surface water clinging to the granulate is centrifuged off, flowing down on the outside of the screen cylinder 4 and leaving the device at the water outlet 7.

Figure 3:
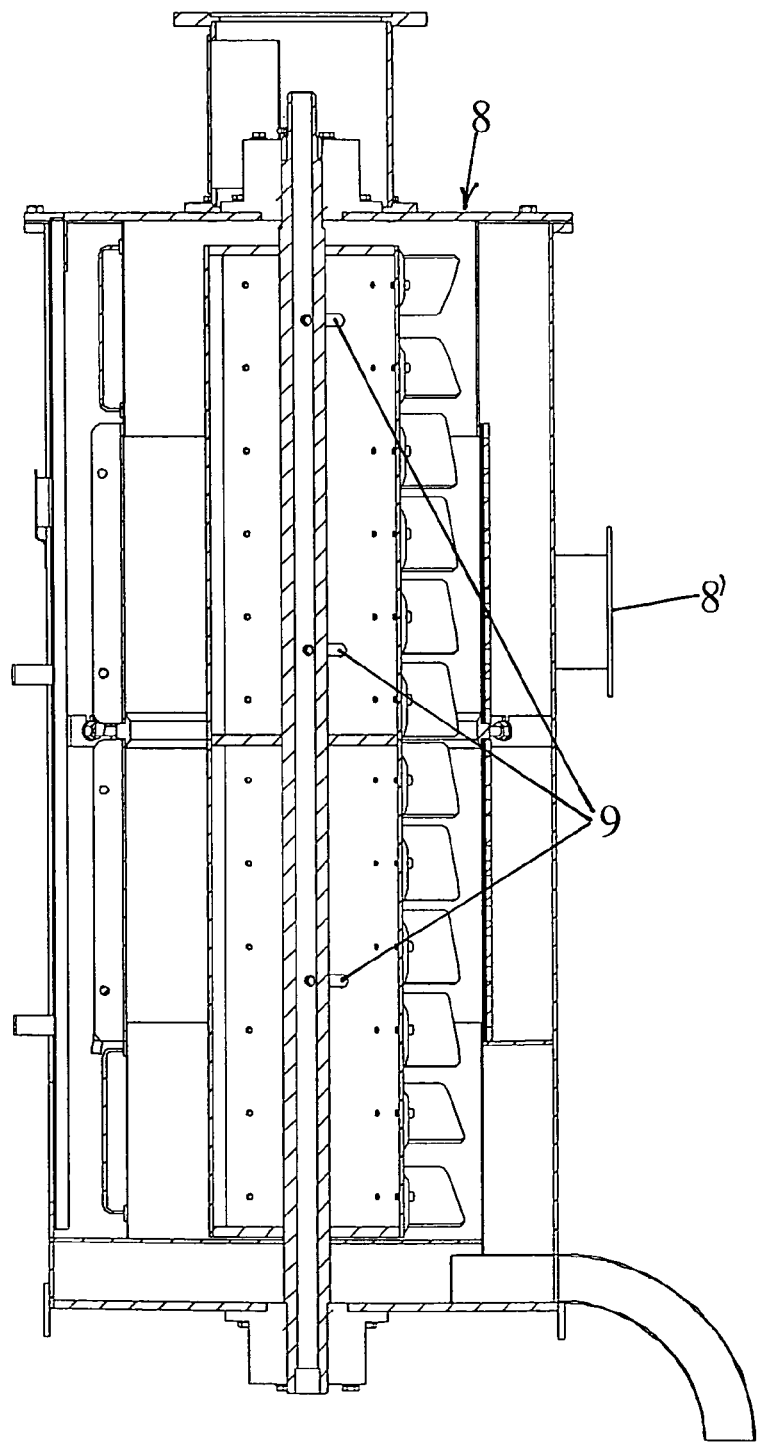

Another device can be seen in FIG. 1 and especially in FIG. 3, by means of which, and of a blower not shown here, a continuous air stream passes vertically through the device. The said air stream causes the residual surface moisture still remaining on the granulate surface to be removed by evaporation or cooling-down drying. The air stream enters the housing at 8 and is again suctioned out by a blower at about half the height of the housing.

Due to the essentially tangential introduction of the granulate and water mixture to the fixed screen cylinder 4 or 10 or to the screen segment 10 in the lower region of the device, upon introduction into the device the granulate is first whirled only over the surface of the screen cylinder 4 or 10 or over the surface of the screen segment 10 so that the water clinging to the granulate can be flung off for the most part only by the centrifugal forces created thereby. As a result, the acceleration imparted upon the granulate and water mixture remains limited by the rotor wings 6 so that the mechanical stressing of the granulate at introduction, i.e. the moment when it has the greater weight due to the adhering surface water, is considerably reduced in contrast to the known devices of the relevant art.

This results in considerably reduced damage, especially regarding the more sensitive granulates, and in a considerably reduced separation of plastic dust or composite material dust.

As can also be seen from FIGS. 1 and 3, a plurality of nozzles is arranged over the surface of the rotor 5 by which nozzles a cleaning fluid is supplied to the device at elevated pressure. The device must be cleaned as completely as possible at every change of granulate in order to avoid contamination of the following granulate charge by adhering deposits.

As mentioned above, in known devices of the relevant art this represents a particular problem since these deposits, as they collect over the height of the device, gather especially in the lower region, and there especially around the inlet opening 2.

In order to provide more effective cleaning in this region, it has been found advantageous to create the fixed screen cylinder 4 from at least three screen cylinders 10, 11 and 12, arranged vertically one over another where each screen cylinder 10, 11 and 12 is composed of at least two segment shells 10', 10", 11', 11", 12', 12". The lowermost screen cylinder 10, as can be seen in FIG. 2, is composed of a screen-like segment 10' and a completely solid segment 10".

The inlet opening 2 is positioned inside the solid segment 10". In addition, the solid segment 10" is covered on the side facing the inside wall of the housing 1 by a cover element 13 whose horizontal region, not visible in FIG. 2, preferably has a slight incline in order to facilitate the draining of the cleaning fluid.

Construction of the screen cylinders 10, 11 and 12 from at least two segments 10', 10", 11', 11", 12', 12" also contributes to an easier disassembly of the screen cylinder 4 during replacement of worn wings 6. It is self-evident that for taller designs, the screen cylinder 11 can be composed of two or more identical screen cylinders 11. The screen cylinders 10, 11 and 12 are connected to one another in a suitable manner.

This construction of the lower screen cylinder 10 from a screen-like segment 10' and a completely solid segment 10" supports in a particularly advantageous way the effect of the tangentially arranged inlet opening 2, which is here in particular arranged inside the segment 10", which has a solid surface. In an advantageous further development, the uppermost screen cylinder 12 is likewise composed of a screen-like segment 12' and a completely solid segment 12" which can substantially reduce the abrasion wear along the edge of the outlet opening 3. This effect is further increased in an advantageous further development by the placement of the outlet 3 tangentially in relation to the screen cylinder 12, and here in particular inside the completely solid segment 12".

In a further advantageous development, the wings 6 are joined to the rotor 5 so as to be individually detachable by means of mounting surfaces 14 attached thereto. Based on this design, it is possible for the first time to select different installation angles of the wings 6 over the extent of the rotor axle, which permits an advantageous regulation of the granulate flow behavior. This measure also permits the device to be optimized for the granulate material to be dried, in that the impact forces are adjusted by the installation angle.

Since the wings 6 are naturally exposed to very high wear that varies in magnitude along the rotor axis, it is now possible for the first time to replace the wings 6 at different times, due to the possibility of installing the wings individually. In this case, the construction of the screen cylinder 4 comprising multiple cylinders 10, 11 and 12 proves to be particularly service-friendly.

In order to increase in-service time of the wings it has been found advantageous to coat parts or all of the wings on one side with a wear protection coating or to fabricate them from a metallic base material with a wear resistant surface.

Additionally, the in-service time of the lower half-shell 10" and the upper half-shell 12" is increased by coating them with a wear resistant coating or fabrication from a metallic base material with a wear resistant surface.

What is claimed is:

1. A centrifuge dryer device for dewatering and drying solids, including plastics granulated in water, said device comprising:
   a housing having a first opening configured to receive wet solid material and a second opening configured as an outlet for dewatered solid material;
   a screen cylinder structure fixedly supported inside the housing;
   a rotor supported inside the screen cylinder structure;
   wings attached to the rotor, said wings being set apart at a distance from one another;
   a water drain receiving water separated from the wet solid material;
   a blower arrangement configured to introduce and remove a vertical air stream through the device; and
   wherein the first opening introduces said wet solid material in a direction that is tangential to the screen cylinder structure.

2. The device according to claim 1, wherein the second opening receives said dewatered solid material in a tangential direction relative to the screen cylinder.

3. The device according to claim 1, wherein the wings are each detachably connected to the rotor using attached mounting surfaces.

4. The device according to claim 1, wherein an angle of attachment of the wings varies over the length of the rotor axle.

5. The device according to claim 1, wherein at least some of the wings are coated with a wear resistant coating or are fabricated from a metallic base material having a wear resistant surface.

6. A centrifuge dryer device for dewatering and drying solids, in particular plastics granulated in water, said device comprising:
- a housing having a first opening configured to receive wet solid material and a second opening configured as an outlet for dehydrated solid material;
- a screen cylinder structure fixedly supported inside the housing;
- a rotor supported inside the screen cylinder structure;
- wings attached to the rotor, said wings being set apart at a distance from one another;
- a water drain receiving water separated from the wet solid material;
- a blower arrangement configured to introduce and remove a vertical air stream through the device;
- wherein the screen cylinder structure comprises at least three screen cylinders supported vertically above one another, each cylinder having at least two segment shells;
- wherein a lowermost screen cylinder comprises a screen-like segment shell and a solid segment shell; and
- wherein the solid segment shell is covered on a side facing an inner wall of the housing by a cover element.

7. The device according to claim 6, wherein the first opening introduces said wet solid material in a direction that is tangential to the screen cylinder.

8. The device according to claim 6, wherein both the first opening and the second opening respectively introduce said wet solid material and receive said dewatered solid material in directions that are tangential to the screen cylinder.

9. The device according to claim 6, wherein the first opening is inside the solid segment shell.

10. The device according to claim 6, wherein the cover element is supported at a horizontal angle.

11. The device according to claim 6, wherein an uppermost screen cylinder comprises a screen-like segment shell and a solid segment shell.

12. The device according to claim 11, wherein the first opening is inside the solid segment shell.

13. The device according to claim 6, wherein the wings are each detachably connected to the rotor using attached mounting surfaces.

14. The device according to claim 6, wherein an angle of attachment of the wings varies over the length of the rotor axle.

15. The device according to claim 6, wherein at least some of the wings are coated with a wear resistant coating or are fabricated from a metallic base material having a wear resistant surface.

16. The device according to claim 6, wherein a solid segment shell of a lowermost screen cylinder is coated with a wear resistant coating or is fabricated from a metallic base material having a wear resistant surface.

17. The device according to claim 6, wherein an upper solid half-shell is coated with a wear resistant coating or is fabricated from a metallic base material having a wear resistant surface.

* * * * *